United States Patent [19]

Saarikko et al.

[11] Patent Number: 5,597,102
[45] Date of Patent: Jan. 28, 1997

[54] ATTACHMENT DEVICE FOR A MOBILE STATION

[75] Inventors: Anssi Saarikko; Lassi Lahti; Pekka Niemi, all of Salo; Robert Hellier; Matti Makkonen, both of Turku, all of Finland

[73] Assignee: Nokia Mobile Phones Ltd., Finland

[21] Appl. No.: 441,600

[22] Filed: May 15, 1995

[30] Foreign Application Priority Data

May 18, 1994 [FI] Finland .................................. 942306

[51] Int. Cl.⁶ .......................... A01K 97/04; A01K 97/06; B65D 25/52
[52] U.S. Cl. .......................... 224/197; 224/191; 224/242; 224/904
[58] Field of Search ..................... 224/242, 197, 224/236, 253, 904, 910; 248/690, 691, 692, 27.3, 221.11, 222.11, 223.41, 224.7, 225.11, 309.11, 314; 24/3.11, 3.12, 669, 702; 2/300; 381/205, 91

[56] References Cited

U.S. PATENT DOCUMENTS

| | | | |
|---|---|---|---|
| 3,370,236 | 2/1968 | Walker | 381/91 |
| 3,878,589 | 4/1975 | Schaefer | 24/222 R |
| 4,479,596 | 10/1984 | Swanson | 224/236 |
| 4,929,116 | 5/1990 | Mahl | 248/225.11 |
| 5,016,326 | 5/1991 | Goldenberg | 24/3 J |

FOREIGN PATENT DOCUMENTS 4015091  1/1991  Germany.

Primary Examiner—Henry J. Recla
Assistant Examiner—Kam Shah
Attorney, Agent, or Firm—Perman & Green

[57] ABSTRACT

A device to be used with a mobile station, comprising a body to be attached e.g. to a belt with an attachment plate and a fastener attached to the mobile station with a fitting piece. The body includes control flanges bent inward from two opposite sides and from below to guide the fastener which comprises a neck and a wider end consisting of a flange placed behind the guide flanges. The body also includes a projection or a similar structure acting against a spring force, resisting the upward movement of the fastener when said fastener is in the locked position.

10 Claims, 3 Drawing Sheets

5,597,102

ATTACHMENT DEVICE FOR A MOBILE STATION

BACKGROUND OF THE INVENTION

The invention relates to a device for removably attaching a mobile station such as a mobile telephone or a paging device to a belt or other garment.

As the number of mobile stations increases people need more often to carry these devices, like mobile telephones or paging devices, with them. Carrying a mobile telephone, for example, in one's hand is inconvenient and as the mobile telephone is unattached it is easy to forget to take it along. Carried in a pocket, a mobile station might get bumped or it might fall and get broken. To solve these problems, there have been developed various racks or holders attached to a belt into which a mobile station, particularly a mobile telephone, can be attached when not in use but instead carried along. The disadvantage of these racks or holders is their rigid and complex structure and the size of the attachment on the telephone. These racks or holders often attach the telephone vertically to the belt making it impossible to rotate the telephone forwards or backwards around the point of attachment, e.g. when sitting down, and as such the telephone may cause a feeling of pressure on the user's waist.

SUMMARY OF THE INVENTION

According to the present invention there is provided a device for removably attaching a portable telephone to a garment, comprising; a first part adapted to be attached to a portable telephone; and a second part adapted to be attached to a garment, wherein the second part further comprises means for slidably receiving and locking the first part such that in the locked condition, relative rotation between the first and second parts is permitted.

An advantage of the invention is that it provides a device that can secure a mobile station to a user's belt or other garment whilst allowing rotation of the mobile station about the point of attachment when required, for example, when sitting down.

Advantages of the embodiments of the invention are that they provide a device with a simple structure and operation, which is easy to install onto and remove from a mobile station, and is simple and inexpensive to manufacture.

For reasons of simplicity, the device in accordance with the invention is described below in association with a mobile telephone attached to a user's belt. A device in accordance with the invention can also be used in connection with other mobile stations, such as pagers, and it can also be attached to garments other than belts.

A device in accordance with the invention comprises two parts: a body of the device which remains on the belt when the telephone is used; and a fastener attached to the telephone with a clip. The telephone can be locked onto the belt and unlocked from it with the help of a locking wedge. While on the belt, the telephone can be rotated, when necessary, around the axis of the fastener and the user can, for example when sitting down, easily rotate the telephone forward or backward around the axis of the fastener so that the telephone will not cause a feeling of pressure on the user's waist. The telephone is easily removed from the belt by holding the body of the device while at the same time lifting the telephone connected to the fastener. The device in accordance with the invention enables easy removal of the telephone from the belt without breaking or scratching the belt or the telephone. When attaching the telephone to the belt the user has to only push the telephone down towards the body of the device and the telephone will be locked to the body with the help of an inward-bent flanged edge on the body and a locking protrusion operating in a biased manner.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
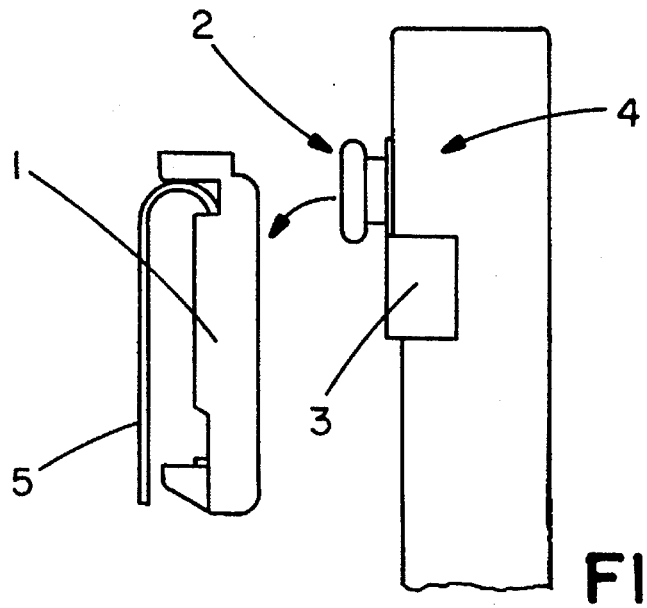
FIG. 1 is a side view of a device in accordance with the invention and a telephone.
Figure 2:
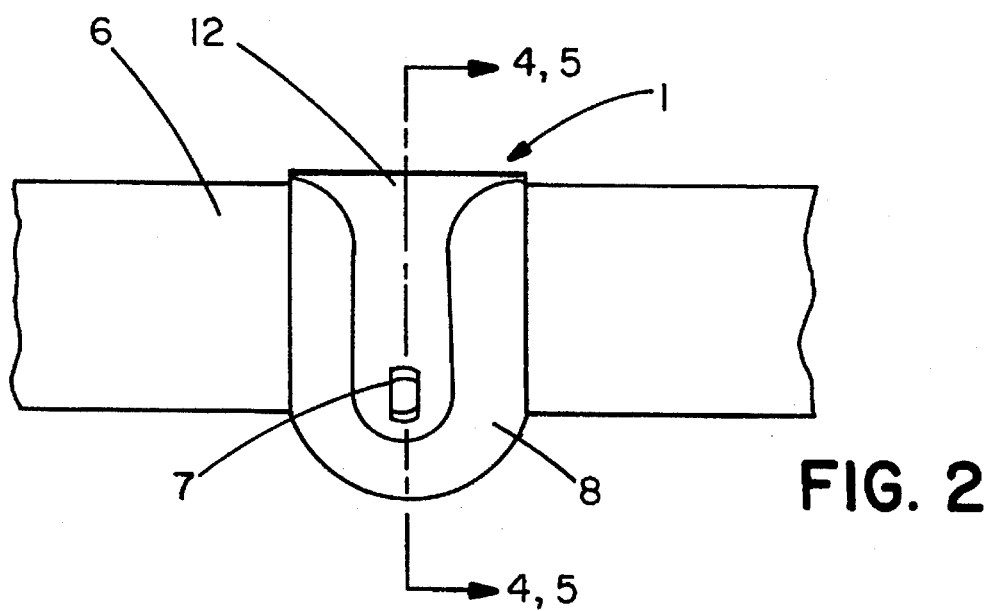
FIG. 2 is a front view of the body of the device in FIG. 1 attached to a belt.

In FIG. 1, there is shown a portable telephone 4 and a device comprising a body 1, a fastener 2, and a clip 3. There is connected to the body 1 a U-shaped plate 5 enabling the body to be attached to a belt. The U-shaped plate 5 comprises a sheet-like part bent in a U-shape and is connected from a point on the bend to the upper portion of the body 1 so that the U-shaped plate 5 is parallel to a flat surface 12 of the body. The U-shaped plate 5 is elastic at the U-bend and can be placed over a belt so that the body 1 remains on the outside of the belt as illustrated in FIG. 2. The lower portion of the branch of the U-shaped plate 5 placed behind the belt can be free or there may be a locking system in it to attach the lower part of the U-shaped plate 5 to the lower part of the body to prevent the body from being pushed up and/or falling out whilst on the belt. The branch of the U-shaped plate 5 placed in front of the belt provides a spring with which a locking protrusion 7 acts.

In FIG. 2, the body 1 is attached with the U-shaped plate 5 (not shown) to a belt 6. The body 1 has a flat surface 12, a rounded lower end and a locking protrusion 7 for locating the fastener 2 shown in FIG. 1 and for locking it within the body 1. The body 1 also includes a guide flange 8 creating a channel which guides the fastener 2 to the correct position over the locking protrusion 7. In this position a flange 9 of the fastener 2 (FIG. 3) locates under the guide flange 8, between the guide flange 8 and the flat surface 12 of the body 1. The distance of the gap between the guide flange 8 and the flat surface 12 of the body corresponds substantially to the thickness of the flange 9 of the fastener 2.

Figure 3:
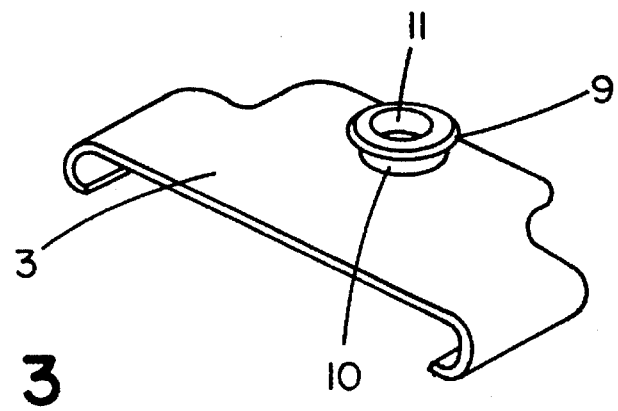
FIG. 3 is the fastener and clip part of the attachment device.

FIGS. 1 and 3 show a clip 3 with which the fastener 2 is attached to the portable telephone 4. The clip 3 is suitable for installing onto the telephone casing transversely with respect to the longitudinal axis of the telephone. The clip 3 comprises a plate bent around the edges of the telephone casing and extending along the sides of the casing such that it corresponds to the shape of the telephone. Furthermore, the ends of the clip 3 are bent in such a manner that they grip a groove-like seam at the join of the front and back covers of the telephone casing or a groove formed in another place on the telephone housing. The bent ends of the clip act as springs which grasp the telephone casing, holding the clip tightly in position.

The clip may also be any other known means for attaching the fastener to a telephone casing.

The fastener 2 is attached to the clip 3 so that it is centrally disposed across the width of the telephone casing. The fastener 2 comprises a neck 10, a flange 9, and recess 11 all of which are radially symmetric and are aligned along a common axis. The length of the neck 10 is slightly greater than the thickness of the guide flange 8 which circles the flat surface 12 of the body. The length may, for example, be about 3 to 10 mm.

Figure 4:
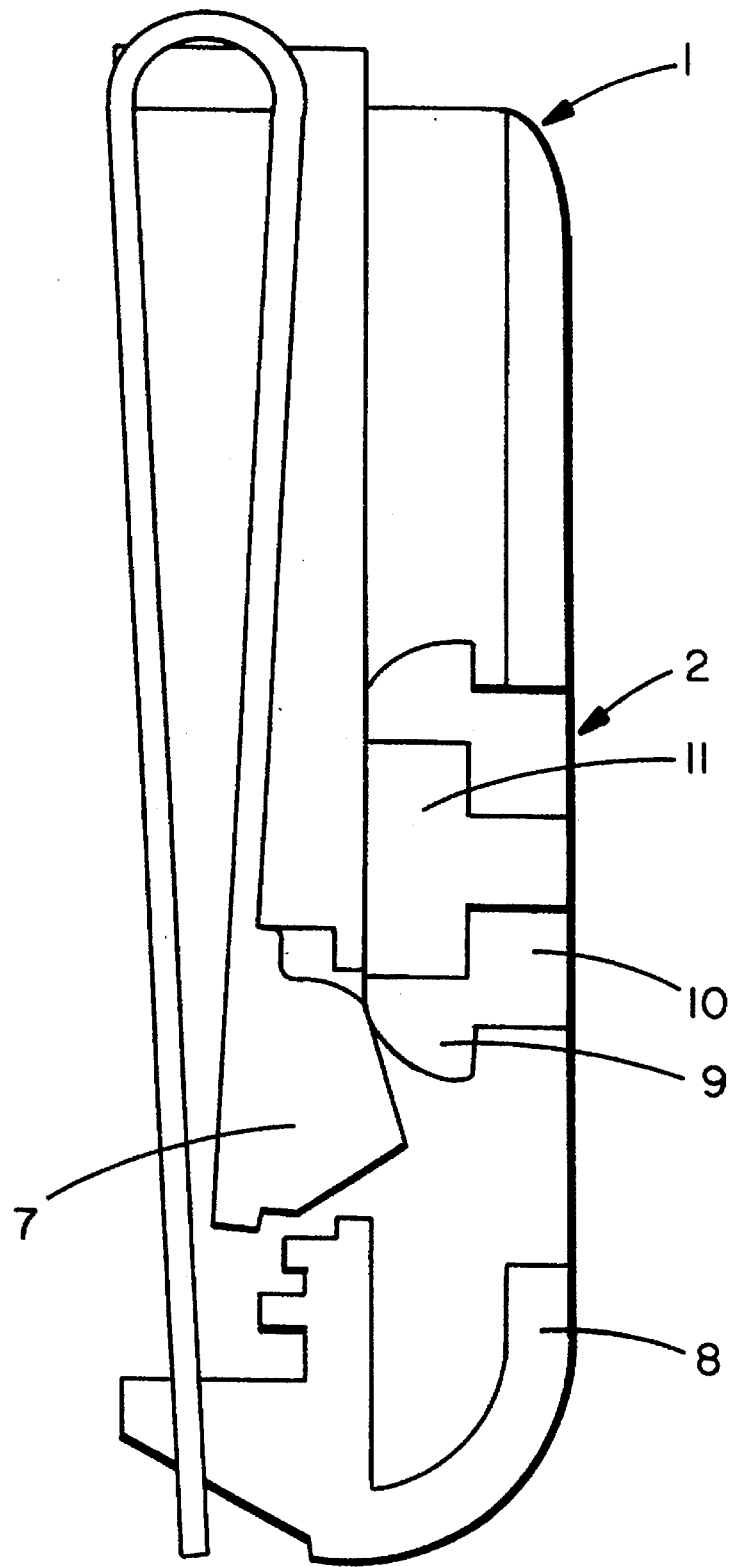
FIG. 4 is a sectional drawing of the body of the attachment device with the fastener being attached to the body.

FIG. 4 illustrates the operating principle of the device in accordance with the invention. The figure shows the body 1 with the locking protrusion 7 and the fastener 2. The clip attached to a telephone is not shown. In the body 1, near its lower end, there is an aperture into which the locking protrusion 7 is positioned. The fastener 2 pushes the locking protrusion 7 back against the spring force of the U-shaped plate 5 when the telephone is removed or inserted. In FIG. 4, the fastener 2, normally attached to a telephone, is being inserted into the body 1 of the device. A guide flange 8 consisting of an edge bent inward circles the sides and the rounded lower part of the body 1. The space between the guide flange 8 and the flat surface 12 of the body is wide enough to house the flange 9 of the fastener 2. The function of the guide flange 8 is to guide the fastener 2 over the locking protrusion 7 and to hold it so that the flange 9 of the fastener 2 stays within space between the flat surface 12 of the body 1 and the guide flange 8.

In FIG. 4, a telephone with the fastener 2 is being pushed downwards in to the body 1. The edges of the locking protrusion 7 in contact with the flange 9 of the fastener 2 are rounded and angled so that the flange 9 of the fastener 2 pushes the locking protrusion 7 back against the spring force enabling the fastener 2 to and slide over it. There is in the fastener 2 a recess 11 with a substantially circular cross section the diameter of which substantially corresponds to the diameter of the locking protrusion 7 in the longitudinal direction of the body 1 so that the locking protrusion 7 fits into the recess 11 when in the locked position of the device.

Figure 5:
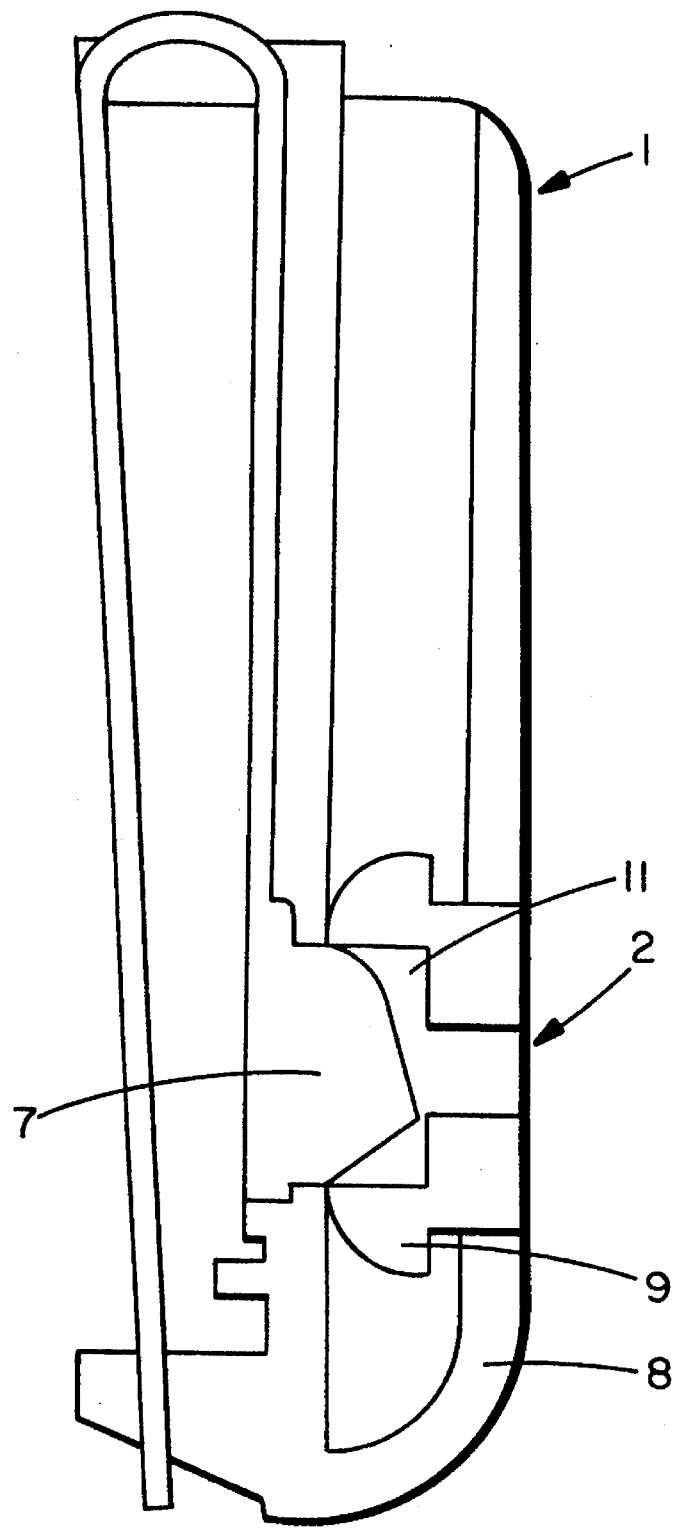
FIG. 5 is a sectional drawing of the body of the attachment device with the fastener locked to the body.

The process by which the body 1 receives the fastener 2 and subsequently locks it in place is illustrated in FIGS. 4 and 5 and is described as follows. The fastener firstly enters the channel formed by the guide flange 8 through an opening located at the top of the body 1. The fastener 2 then slides downwards in the channel until the flange 9 of the fastener 2 contacts the locking protrusion 7 as shown in FIG. 4. Further urged sliding of the fastener 2 forces the locking protrusion 7 against a biasing action, in a direction away from the fastener 2 and thus clearing the channel to allow the fastener 2 to proceed to the position shown in FIG. 5 in this position the fastener 2 is snap locked in respect of sliding movement up or down the channel. The channel also prevents displacement along other perpendicular axis. Rotation of the fastener 2 with respect to the body 1 is, however, permitted. Subsequent removal of the fastener from the body is achieved by urged sliding of the fastener upwards towards the opening of the channel. The action of the inner, recess surface of the flange 9 against the angled surface of the locking protrusion 7 forces the locking protrusion 7 in a direction away from the fastener 2, thus clearing the channel. Once past the locking protrusion 7 the fastener 2 is then allowed to freely slide upwards along the channel and eventually out through the opening at the top of the body 1.

FIG. 5 shows the fastener 2, normally attached to a telephone, installed in the locked position within the body 1.

The locking protrusion 7 is located in the recess 11 of the fastener 2. The flange 9 of the fastener 2 is between the flat surface 12 of the body 1 and the guide flange 8.

The telephone can be easily and quickly removed from the belt by holding the body of the device and at the same time lifting the telephone upwards. In this situation the locking protrusion 7 is pushed back, due to it having an angled edge, against the spring force of the U-shaped plate 5 enabling the fastener 2 to slide over it.

The neck 10 with a circular outer perimeter and the flanges 9 and the guide flange 8 circling the edge of the flat surface of the body with a rounded lower part and the recess 11 of the fastener 2 with a circular cross section allow the fastener 2 to rotate around its common axis in the locked position. Because of this construction, the telephone can be rotated around the axis of the fastener forward or backward, for example when sitting down.

What is claimed is:

1. An attachment device to be used with a mobile station which is removable from the attachment device and reinstallable to it, wherein the attachment device comprises a body having an attachment plate with peripheral side portions adaptable to be attached to a belt and a fastener having a fitting piece adaptable to be attached to said mobile station, said body including guide flanges formed by said side portions, bent inward from two opposite sides thereof and from a lower side thereof to guide the fastener, the fastener including a neck and a wider end comprising a flange which slides behind the guide flanges, to a locked position behind said side and lower flanges and said body including a projection and a spring member acting against said projection, which when the fastener is in the locked position, resists the upward movement of the fastener.

2. An attachment device as claimed in claim 1, wherein the distance between the guide flange and the flat part of the body essentially corresponds to the thickness of the flange of the fastener.

3. An attachment device as claimed in claim 1, wherein the length of the neck of the fastener is greater than the thickness of the guide flange circling the flat part of the body.

4. An attachment device as claimed in claim 1, wherein the mobile station includes a longitudinally extending casting and the fitting piece comprises a plate adapted to be installed on the casing of the mobile station adjacent to one end thereof, said plate being essentially transversely to the longitudinal axis of the mobile station, bent at both ends to be complecentally fit over the casing of the mobile station.

5. An attachment device as claimed in claim 4, wherein opposite sides of said casing includes longitudinally extending grooves and the farthest ends of the fitting piece are bent in such a manner that they grip the groove in each side of the casing of the mobile station and act as springs pressing the fitting piece against the casing of the mobile station.

6. An attachment device as claimed in claim 1 wherein the body comprises a flat part with a rounded lower end and wherein said projection comprises a locking cone with rounded edges acting against a spring force, and said guide flanges are formed of an edge bent inwardly and circling the sides and the rounded lower end of the flat part of the body, which guides the fastener over the locking cone, said fastener comprising a neck with a circular outer perimeter and a flange with a circular outer perimeter and containing an axially depressed recess with a circular cross section; and, in the locked position, the locking cone is positioned in said recess of the fastener, the diameter of said recess corresponding to the diameter of the locking cone at least in the longitudinal direction of the body.

7. An attachment device as claimed in claim 1, wherein the attachment plate comprises a plate bent in the form of a U, attached at the point of the bend in the U to the upper end of the flat part of the body.

8. An attachment device as claimed in claim 7, wherein a first leg of the U-shaped attachment plate is adapted to be placed under a belt and is free.

9. An attachment device as claimed in claim 8, wherein the second leg of the U-shaped attachment plate is adapted to be placed over a belt and serves as said spring member acting against the locking cone.

10. An attachment device as claimed in claim 8, wherein a second leg of the U-shaped attachment plate is attached to the body.

* * * * *